(12) United States Patent
Roth et al.

(10) Patent No.: US 11,228,192 B1
(45) Date of Patent: Jan. 18, 2022

(54) ELECTRICAL ROADSIDE ASSISTANCE VEHICLE

(71) Applicants: Robert Roth, Myrtle Beach, SC (US); Deborah Roth, Myrtle Beach, SC (US)

(72) Inventors: Robert Roth, Myrtle Beach, SC (US); Deborah Roth, Myrtle Beach, SC (US)

( * ) Notice: Subject to any disclaimer, the term of this patent is extended or adjusted under 35 U.S.C. 154(b) by 0 days.

(21) Appl. No.: 17/102,609

(22) Filed: Nov. 24, 2020

(51) Int. Cl.
| | | |
|---|---|---|
| *H02J 7/00* | (2006.01) | |
| *H02J 7/35* | (2006.01) | |
| *B60L 53/60* | (2019.01) | |
| *H02S 10/40* | (2014.01) | |
| *H02S 20/32* | (2014.01) | |
| *H02S 40/38* | (2014.01) | |
| *B60L 53/57* | (2019.01) | |
| *B60L 53/51* | (2019.01) | |

(52) U.S. Cl.
CPC ............ *H02J 7/0068* (2013.01); *B60L 53/60* (2019.02); *H02J 7/35* (2013.01); *H02S 10/40* (2014.12); *H02S 20/32* (2014.12); *H02S 40/38* (2014.12); *B60L 53/51* (2019.02); *B60L 53/57* (2019.02); *H02J 2300/24* (2020.01); *H02J 2310/48* (2020.01)

(58) Field of Classification Search
CPC .. H02J 7/0068; H02J 2300/24; H02J 2310/48; H02J 7/35; H02J 7/00; H02S 10/40; H02S 20/32; H02S 40/38; B60L 53/60; B60L 53/57; B60L 53/51
See application file for complete search history.

(56) References Cited

U.S. PATENT DOCUMENTS

| | | | |
|---|---|---|---|
| 8,963,481 B2* | 2/2015 | Prosser | B60L 1/006 320/104 |
| 9,731,614 B1 | 8/2017 | Sarwat | |
| 10,556,513 B2 | 2/2020 | Kamen | |
| 2014/0042956 A1* | 2/2014 | Wheatley | H02J 7/35 320/101 |
| 2017/0361717 A1 | 12/2017 | Qin | |
| 2019/0135125 A1 | 5/2019 | Sponheimer | |
| 2019/0135133 A1 | 5/2019 | Miller | |
| 2019/0351773 A1 | 11/2019 | Merritt | |
| 2019/0351783 A1 | 11/2019 | Goel | |

FOREIGN PATENT DOCUMENTS

WO 2019222369 11/2019

* cited by examiner

*Primary Examiner* — Robert L Deberadinis

(57) ABSTRACT

The electrical roadside assistance vehicle is configured for use with a vehicle. The vehicle is a roadside assistance vehicle used to assist a vehicle that is in need of assistance. The electrical roadside assistance vehicle forms a source of electric energy used to assist the vehicle that is in need of assistance. The electrical roadside assistance vehicle comprises the roadside assistance vehicle, a control circuit, and a mounting structure. The mounting structure secures the control circuit to the bed of the roadside assistance vehicle. The control circuit is the source of electric energy used to assist the vehicle that is in need of assistance. The control circuit is independently powered. By independently powered is meant that control circuit operates without an electrical connection to an external power source.

18 Claims, 7 Drawing Sheets

ELECTRICAL ROADSIDE ASSISTANCE VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including vehicle parts not otherwise provided for, more specifically, an electric circuit specifically adapted for a vehicle. (B60R16/02)

SUMMARY OF INVENTION

The electrical roadside assistance vehicle is configured for use with a vehicle. The vehicle is a roadside assistance vehicle used to assist a vehicle that is in need of assistance. The roadside assistance vehicle is further defined with a bed. The bed is a surface on which the electrical roadside assistance vehicle mounts. The electrical roadside assistance vehicle forms a source of electric energy used to assist the vehicle that is in need of assistance. The electrical roadside assistance vehicle comprises the roadside assistance vehicle, a control circuit, and a mounting structure. The mounting structure secures the control circuit to the bed of the roadside assistance vehicle. The control circuit is the source of electric energy used to assist the vehicle that is in need of assistance. The control circuit is independently powered. By independently powered is meant that control circuit operates without an electrical connection to an external power source.

These together with additional objects, features and advantages of the electrical roadside assistance vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the electrical roadside assistance vehicle in detail, it is to be understood that the electrical roadside assistance vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electrical roadside assistance vehicle.

It is therefore important that the claims be regarded as including such equivalent construction insofar as they do not depart from the spirit and scope of the electrical roadside assistance vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
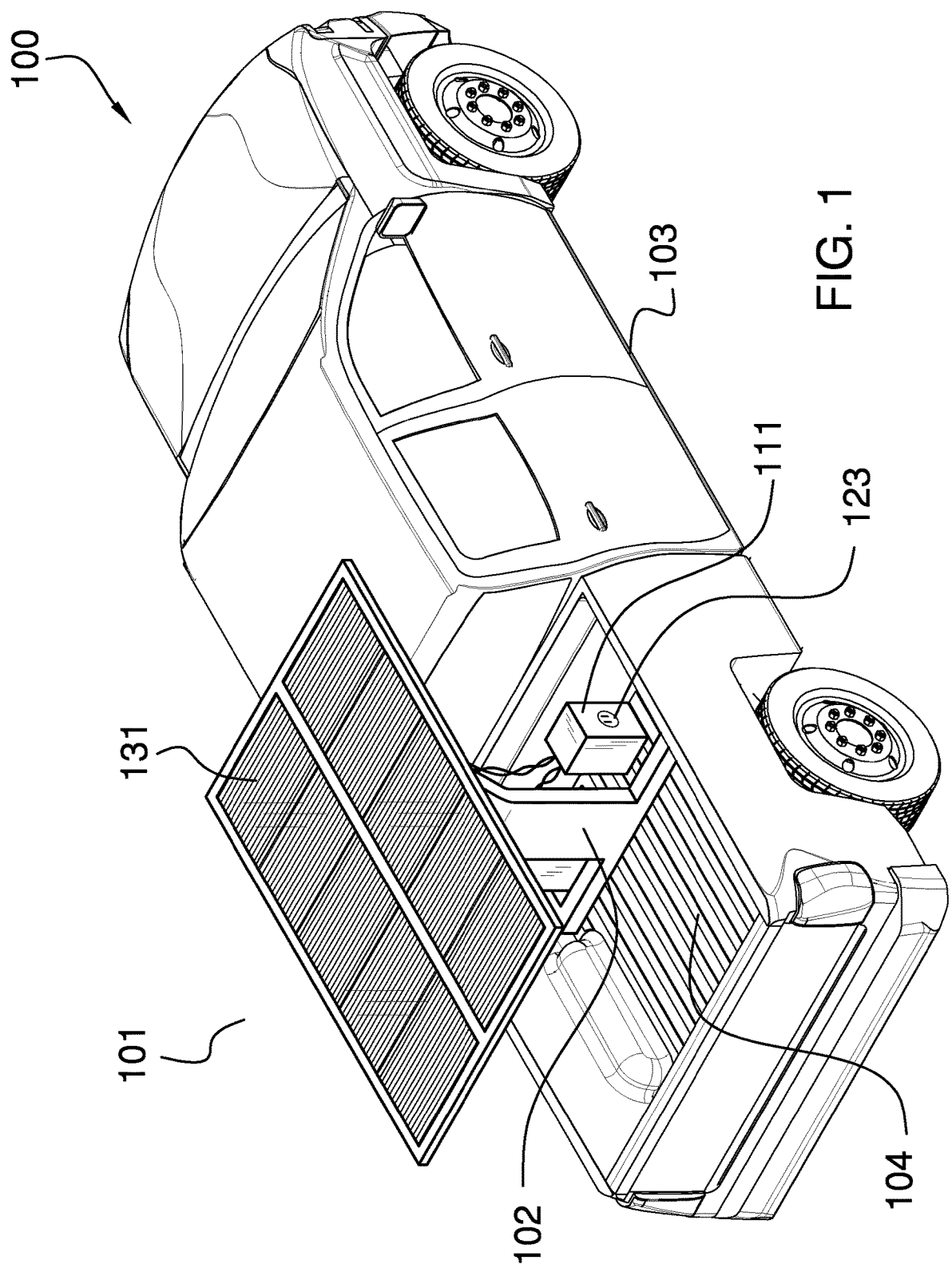
FIG. 1 is a perspective view of an embodiment of the disclosure.
Figure 2:
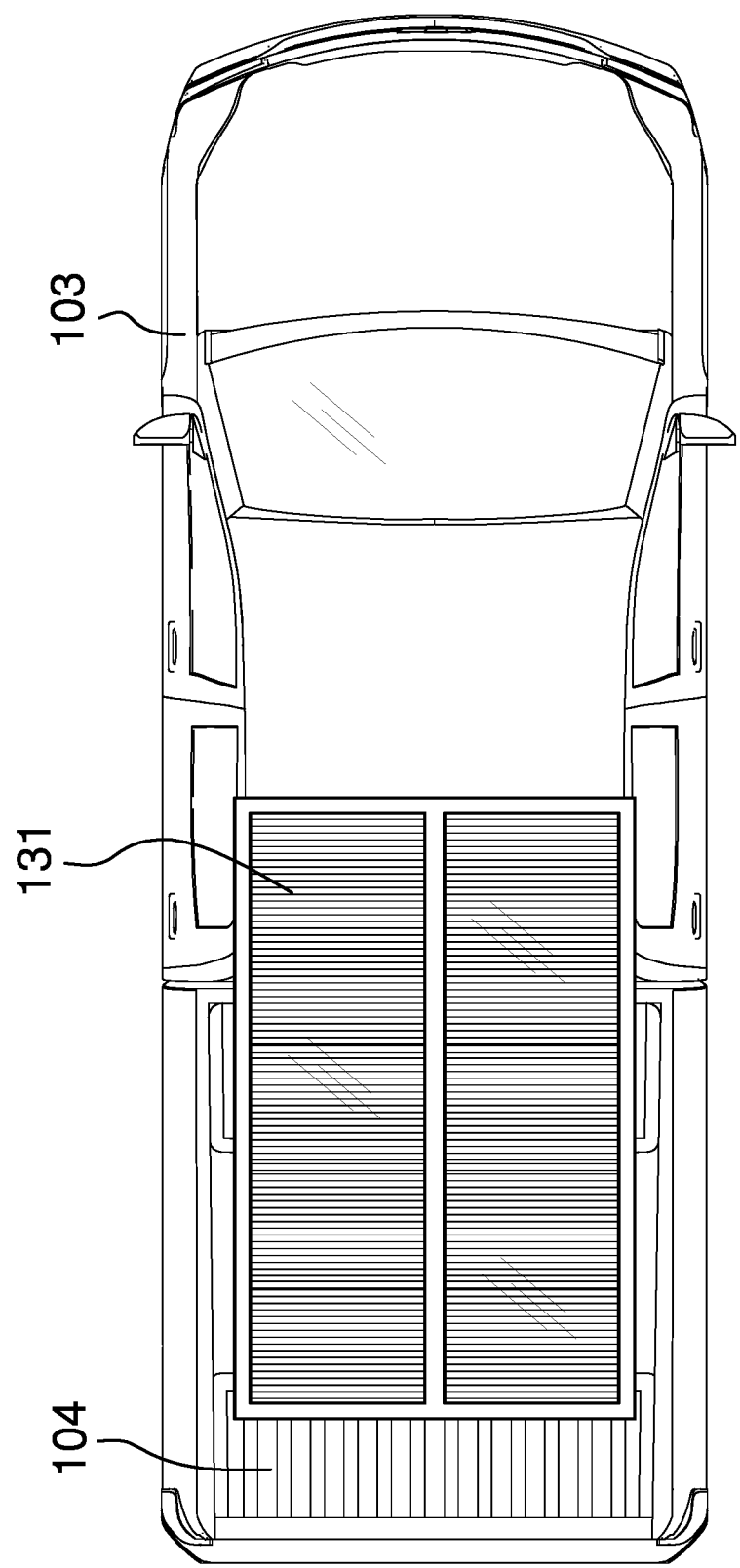
FIG. 2 is a top view of an embodiment of the disclosure.
Figure 3:
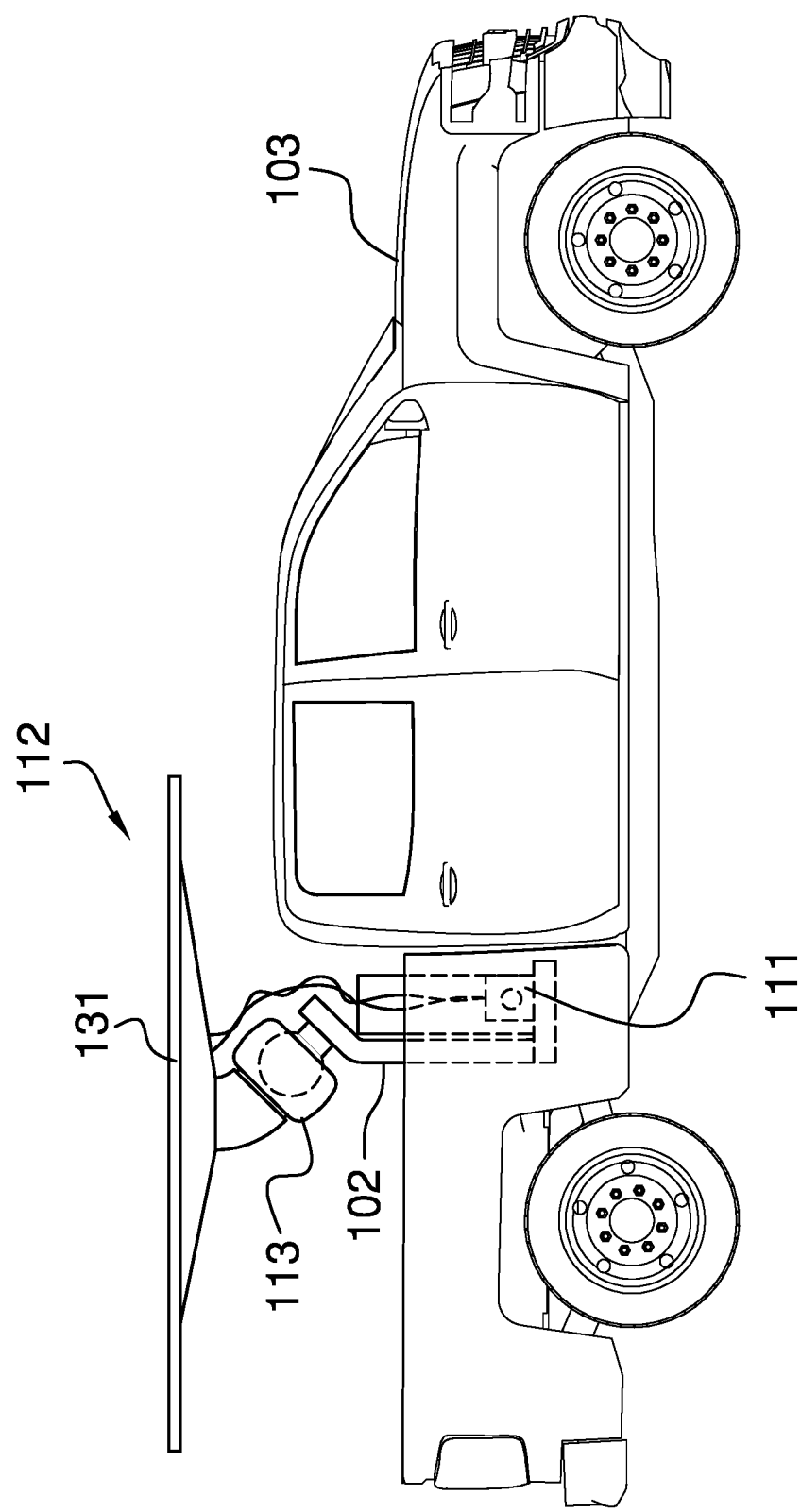
FIG. 3 is a side view of an embodiment of the disclosure.
Figure 4:
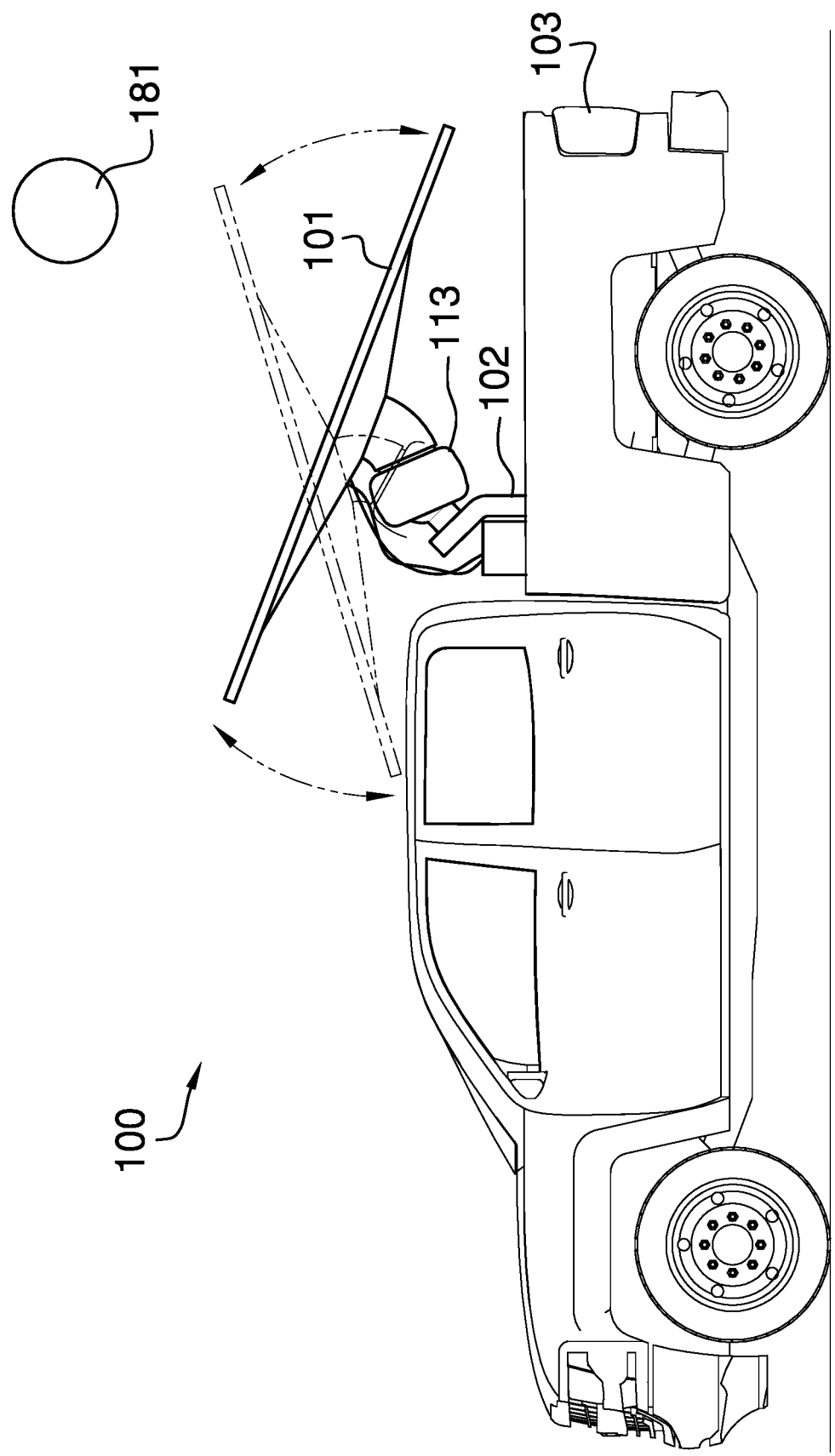
FIG. 4 is a reverse side view of an embodiment of the disclosure.
Figure 6:
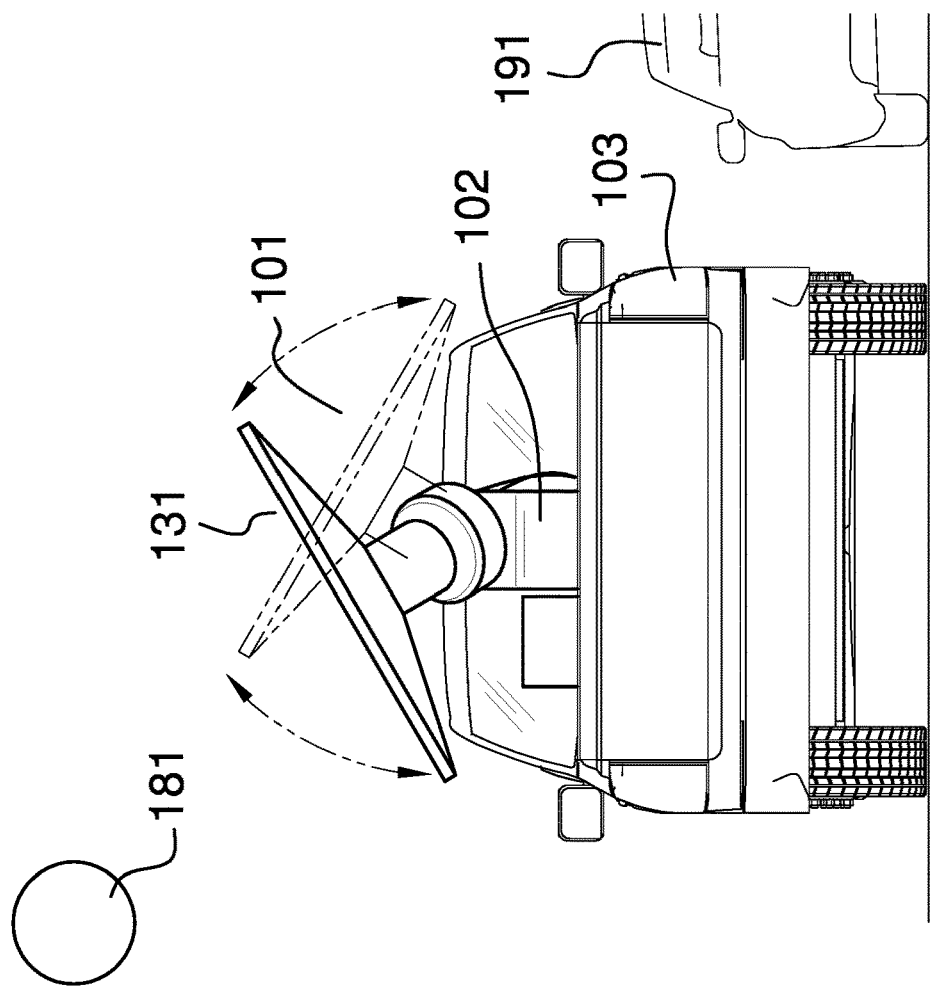
FIG. 6 is an in-use view of an embodiment of the disclosure.
Figure 5:
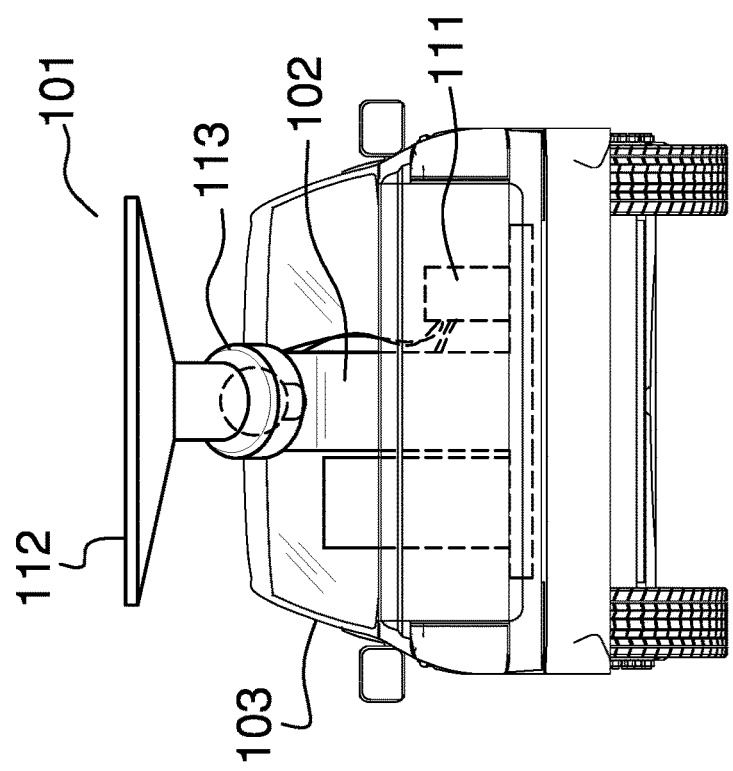
FIG. 5 is an in-use view of an embodiment of the disclosure.
Figure 7:
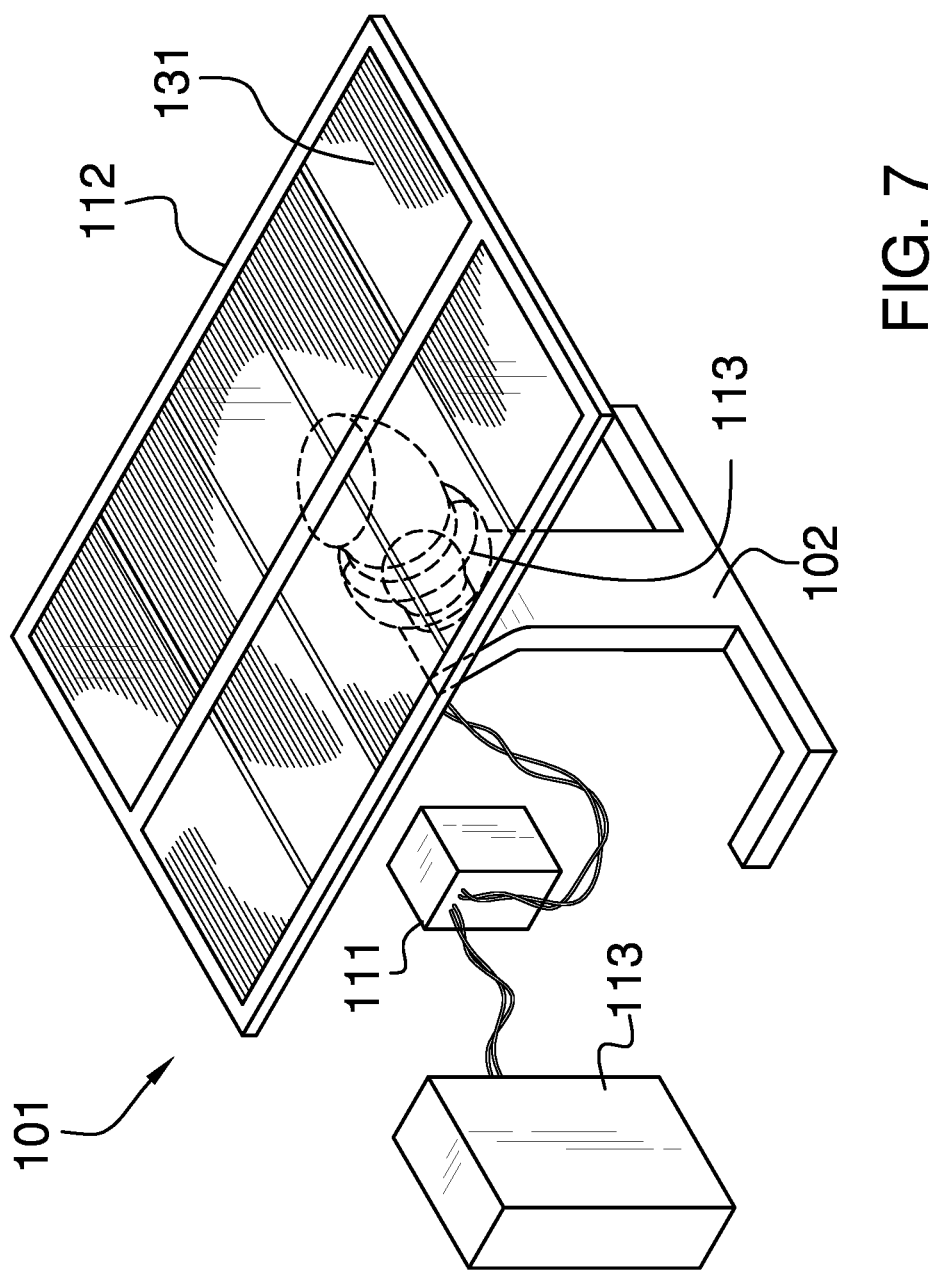
FIG. 7 is a detail view of an embodiment of the disclosure.
Figure 8:
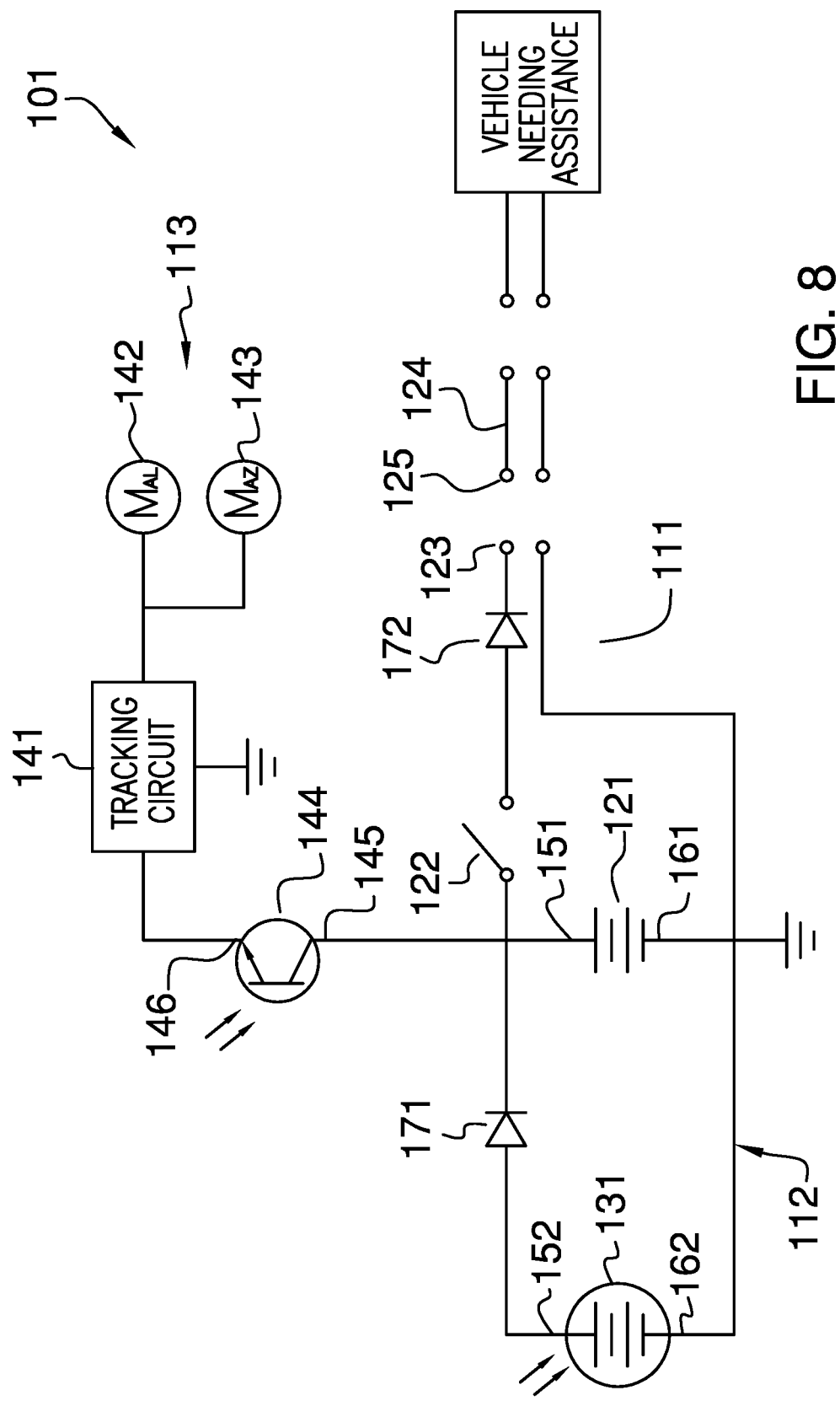
FIG. 8 is a schematic view of an embodiment of the disclosure.

Detailed reference will now be made to one or more potential embodiments of the disclosure, which are illustrated in FIGS. 1 through 8.

The electrical roadside assistance vehicle 100 (hereinafter invention) is configured for use with a vehicle. The vehicle is a roadside assistance vehicle 103 used to assist a vehicle that is in need of assistance 191. The roadside assistance vehicle is further defined with a bed 104. The bed 104 is a surface on which the invention 100 mounts. The invention 100 forms a source of electric energy used to assist the vehicle that is in need of assistance 191. The invention 100 comprises the roadside assistance vehicle 103, a control circuit 101, and a mounting structure 102. The mounting structure 102 secures the control circuit 101 to the bed 104 of the roadside assistance vehicle 103. The control circuit 101 is the source of electric energy used to assist the vehicle that is in need of assistance 191. The control circuit 101 is independently powered. By independently powered is meant that control circuit 101 operates without an electrical connection to an external power source.

The control circuit 101 is an electric circuit. The control circuit 101 provides the electrical energy necessary to help a vehicle that is in need of assistance 191. The control circuit 101 converts electromagnetic radiation into electric energy. The electromagnetic radiation is generated by the sun 181. The control circuit 101 converts the electricity generated by the electromagnetic radiation into chemical potential energy for storage. The control circuit 101 converts the stored chemical potential energy into electric energy used to assist the vehicle that is in need of assistance 191. The control circuit 101 further converts the stored chemical potential energy into electric energy that is used to track the sun 181 such that the generation of electricity from the electromagnetic radiation is optimized. The control circuit 101 forms a rotating structure that allows the control circuit 101 to track the sun 181 such that the generation of electricity from the electromagnetic radiation is optimized.

The control circuit 101 comprises a power circuit 111, a charging circuit 112, and a positioning circuit 113. The power circuit 111, the charging circuit 112, and the positioning circuit 113 are electrically interconnected.

The power circuit 111 is an electric circuit. The power circuit 111 is an electrochemical device. The power circuit 111 provides electric energy used to assist the vehicle that is in need of assistance 191. The power circuit 111 provides the electrical energy necessary to operate the positioning circuit 113. The power circuit 111 is an electric circuit. The power circuit 111 powers the operation of the control circuit 101. The power circuit 111 is an electrochemical device. The power circuit 111 converts chemical potential energy into the electrical energy required to power the control circuit 101. The power circuit 111 is an independently powered electric circuit. By independently powered is meant that the power circuit 111 can operate without an electrical connection to an external power source such as a generator.

The power circuit 111 comprises a battery 121, a power switch 122, a power distribution port 123, a cable 124, and a second diode 172. The cable 124 further comprises a power distribution plug 125. The battery 121, the power switch 122, the power distribution port 123, the cable 124, the power distribution plug 125, and the second diode 172 are electrically interconnected. The battery 121 further comprises a first positive terminal 151 and a first negative terminal 161.

The battery 121 is an electrochemical device. The battery 121 converts chemical potential energy into the electrical energy used to power the control circuit 101. The battery 121 is a rechargeable battery 121.

The power switch 122 is a maintained switch. The power switch 122 forms a series connection between the battery 121 and the power distribution port 123. The power switch 122 controls the flow of electric energy from the battery 121 to the power distribution port 123.

The power distribution port 123 is an electric port. The power distribution port 123 presents electric energy transmitted from the battery 121 that can be used to assist the vehicle that is in need of assistance 191. The power distribution port 123 forms an electrical connection with the cable 124. The power distribution port 123 receives the electric energy transmitted from the battery 121 through the power distribution port 123.

The cable 124 is an electrically conductive structure. The cable 124 transmits electric energy received from the battery 121 to the vehicle that is in need of assistance 191. The cable 124 is defined elsewhere in this disclosure.

The power distribution plug 125 is an electric plug. The power distribution plug 125 forms an electrical connection with the power distribution port 123. The power distribution plug 125 inserts into the power distribution port 123 such that the power distribution plug 125 transmits electricity from the power distribution port 123 into the cable 124.

The second diode 172 is an electric circuit element. The second diode 172 limits the flow of electric energy through the second diode 172 to a single direction. The second diode 172 electrically connects in series between the power switch 122 and the power distribution port 123 such that electric energy will not flow from the cable 124 into the battery 121 through the power switch 122.

The charging circuit 112 is an electric circuit. The charging circuit 112 receives electromagnetic radiation from the sun 181. The charging circuit 112 converts the received electromagnetic radiation into electric energy. The charging circuit 112 transmits the generated electric energy to the battery 121 of the power circuit 111. The charging circuit 112 comprises a photovoltaic cell 131 and a first diode 171. The photovoltaic cell 131 and the first diode 171 are electrically interconnected. The photovoltaic cell 131 further comprises a second positive terminal 152 and a second negative terminal 162.

The photovoltaic cell 131 is an electric device that converts electromagnetic radiation into electrical energy. The photovoltaic cell 131 is defined elsewhere in this disclosure. The chemical energy stored within the rechargeable battery 121 is further renewed and restored through the use of the photovoltaic cell 131. The photovoltaic cell 131 is directly wired to the battery 121. The photovoltaic cell 131 is an electrical circuit that reverses the polarity of the rechargeable battery 121 and provides the energy necessary to reverse the chemical processes that the rechargeable battery 121 initially used to generate the electrical energy. This reversal of the chemical process creates a chemical potential energy that will later be used by the rechargeable battery 121 to generate electricity. The first diode 171 is an electrical device that allows current to flow in only one direction. The first diode 171 installs between the rechargeable battery 121 and the photovoltaic cell 131 such that electricity will not flow from the first positive terminal 151 of the rechargeable battery 121 into the second positive terminal 152 of photovoltaic cell 131. The photovoltaic cell 131 is defined elsewhere in this disclosure.

The positioning circuit 113 is an electric circuit. The positioning circuit 113 is an electromechanical device. The positioning circuit 113 detects the position of the sun 181 relative to the photovoltaic cell 131 of the charging circuit 112. The positioning circuit 113 provides the motive forces necessary to rotate the position of the photovoltaic cell 131 relative to the sun 181. The positioning circuit 113 forms a feedback mechanism that maintains the position of the photovoltaic cell 131 at a roughly constant position relative to the position of the sun 181. The position of the photovoltaic cell 131 relative to the sun 181 that is maintained by the positioning circuit 113 is selected to maximize the electric energy generated by the photovoltaic cell 131.

The positioning circuit 113 comprises a tracking circuit 141, an altitude motor 142, an azimuth motor 143, and a phototransistor 144. The tracking circuit 141, the altitude motor 142, the azimuth motor 143, and the phototransistor 144 are electrically interconnected. The phototransistor 144 further comprises a collector 145 and an emitter 146.

The tracking circuit 141 is an electric circuit. The tracking circuit 141 controls the operation of the altitude motor 142. The tracking circuit 141 controls the operation of the azimuth motor 143. The tracking circuit 141 detects the position of the sun 181 relative to the photovoltaic cell 131 of the charging circuit 112. The tracking circuit 141 forms a feedback mechanism that maintains the position of the photovoltaic cell 131 at a roughly constant position relative to the position of the sun 181. The tracking circuit 141 uses the altitude motor 142 to adjust the altitude angle of the photovoltaic cell 131 relative to the sun 181. The tracking circuit 141 uses the azimuth motor 143 to adjust the azimuth angle of the photovoltaic cell 131 relative to the sun 181.

The altitude motor 142 is an electric motor. The electric motor is defined elsewhere in this disclosure. The tracking circuit 141 controls the direction of rotation of the altitude motor 142. The altitude motor 142 controls the speed of rotation of the altitude motor 142. The altitude motor 142 physically attaches to the photovoltaic cell 131 such that the rotation of the altitude motor 142 adjusts the altitude angle of the photovoltaic cell 131.

The azimuth motor 143 is an electric motor. The electric motor is defined elsewhere in this disclosure. The tracking circuit 141 controls the direction of rotation of the azimuth motor 143. The azimuth motor 143 controls the speed of rotation of the azimuth motor 143. The azimuth motor 143 physically attaches to the photovoltaic cell 131 such that the rotation of the azimuth motor 143 adjusts the azimuth angle of the photovoltaic cell 131.

The phototransistor 144 is a photoelectric circuit element. The phototransistor 144 forms a series electric connection between the battery 121 and the tracking circuit 141. The phototransistor 144 controls the flow of electric energy into the tracking circuit 141 such that the tracking circuit 141 will only operate when the phototransistor 144 detects the presence of the sun 181.

The phototransistor 144 operates as switch. When light is applied to the phototransistor 144, the phototransistor 144 will act like a closed switch allowing current flow from the collector 145 to the emitter 146. When the light is removed from the base, the phototransistor 144 will act like an open switch prohibiting current flow from the collector 145 to the emitter 146.

The mounting structure 102 is a mechanical structure. The mounting structure 102 forms a pedestal that elevates the charging circuit 112 and the positioning circuit 113 above the bed 104 of the roadside assistance vehicle 103. Specifically, the mounting structure 102 raises the photovoltaic cell 131, the altitude motor 142, and the azimuth motor 143 above the bed 104 of the roadside assistance vehicle 103 such that the photovoltaic cell 131 can rotate relative to the roadside assistance vehicle 103. The photovoltaic cell 131 rotates relative to the roadside assistance vehicle 103 such that the photovoltaic cell 131 maintains a roughly fixed position relative to the sun 181.

The following definitions were used in this disclosure:

Altitude: As used in this disclosure, the altitude, or altitude angle, refers to an angle that is measured in a plane that is: 1) parallel to the force of gravity; and, 2) perpendicular to the azimuth.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles. The automobile further comprises an electrical system. The automobile is often defined with a trunk. The trunk is an enclosed storage chamber formed within the automobile.

Azimuth: As used in this disclosure, the azimuth, or azimuth angle, refers to an angle that is measured in a plane that is perpendicular to the either the vertical direction or the force of gravity.

Battery: As used in this disclosure, a battery is a chemical device consisting of one or more cells, in which chemical energy is converted into electricity and used as a source of power. Batteries are commonly defined with a positive terminal and a negative terminal.

Cable: As used in this disclosure, a cable is a collection of one or more insulated wires covered by a protective casing that is used for transmitting electricity or telecommunication signals.

Control Circuit: As used in this disclosure, a control circuit is an electrical circuit that manages and regulates the behavior or operation of a device.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Electromagnetic Radiation: As used in this disclosure, electromagnetic radiation refers to an interaction between electric fields and magnetic fields that is capable of transmitting energy through a vacuum.

External Power Source: As used in this disclosure, an external power source is a source of the energy that is externally provided to enable the operation of the present disclosure. Examples of external power sources include, but are not limited to, electrical power sources and compressed air sources.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Force of Gravity: As used in this disclosure, the force of gravity refers to a vector that indicates the direction of the pull of gravity on an object at or near the surface of the earth.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Maintained Switch: A used in this disclosure, a maintained switch is a switch that maintains the position that was set in the most recent switch actuation. A maintained switch works in an opposite manner to a momentary switch.

Motor: As used in this disclosure, a motor refers to the method of transferring energy from an external power source into rotational mechanical energy.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Pedestal: As used in this disclosure, a pedestal is an intermediary load bearing structure that that forms a load path between two objects or structures.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Phototransistor: As used in this disclosure, a phototransistor is a two terminal photoelectric device that performs in the manner of a transistor within an electrical circuit. Specifically, when exposed to light a phototransistor will behave as a transistor with a voltage applied to the base that creates a base current flow into the transistor.

Photovoltaic Cell: As used in this disclosure, a photovoltaic cell is a photoelectric device that directly converts light energy into electrical energy.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, a right sidewall, and an end wall.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Radiation: As used in this disclosure, radiation refers to the discharge of energy from an object. The term is often applied to energy in the form of: a) waves, such as electromagnetic radiation or acoustic energy; b) nuclear radiation such as alpha, beta, and gamma, particle radiation; and, c) gravitational waves. The radiation of electromagnetic waves is often classified by the wavelength of the generated waves, such as ultraviolet and infrared radiation.

Roughly: As used in this disclosure, roughly refers to a comparison between two objects. Roughly means that the difference between one or more parameters of the two compared objects are not significantly different.

Superior: As used in this disclosure, the term superior refers to a directional reference that is parallel to and in the opposite direction of the force of gravity when an object is positioned or used normally.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Vehicle: As used in this disclosure, a vehicle is a device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electrical roadside assistance vehicle comprising
   a roadside assistance vehicle, a control circuit, and a mounting structure;
   wherein the mounting structure secures the control circuit to the roadside assistance vehicle;
   wherein the roadside assistance vehicle further comprises a bed;
   wherein the bed is a surface on which the electrical roadside assistance vehicle mounts;
   wherein the electrical roadside assistance vehicle forms a source of electric energy used to assist the vehicle that is in need of assistance;

wherein the control circuit is the source of electric energy used to assist the vehicle that is in need of assistance;
wherein the control circuit converts electromagnetic radiation into electric energy;
wherein the electromagnetic radiation is generated by the sun;
wherein the control circuit comprises a power circuit, a charging circuit, and a positioning circuit;
wherein the power circuit, the charging circuit, and the positioning circuit are electrically interconnected;
wherein the power circuit comprises a battery, a power switch, a power distribution port, a cable, and a second diode;
wherein the cable further comprises a power distribution plug;
wherein the battery, the power switch, the power distribution port, the cable, the power distribution plug, and the second diode are electrically interconnected;
wherein the battery further comprises a first positive terminal and a first negative terminal;
wherein the cable is an electrically conductive structure;
wherein the cable transmits electric energy received from the battery to the vehicle that is in need of assistance;
wherein the power distribution plug is an electric plug;
wherein the power distribution plug forms an electrical connection with the power distribution port.

2. The electrical roadside assistance vehicle according to claim 1
wherein the control circuit is independently powered;
wherein by independently powered is meant that control circuit operates without an electrical connection to an external power source.

3. The electrical roadside assistance vehicle according to claim 2
wherein the control circuit is an electric circuit;
wherein the control circuit provides the electrical energy necessary to help a vehicle that is in need of assistance.

4. The electrical roadside assistance vehicle according to claim 3
wherein the control circuit converts the electricity generated by the electromagnetic radiation into chemical potential energy for storage;
wherein the control circuit converts the stored chemical potential energy into electric energy used to assist the vehicle that is in need of assistance;
wherein the control circuit further converts the stored chemical potential energy into electric energy that is used to track the sun such that the generation of electricity from the electromagnetic radiation is optimized;
wherein the control circuit forms a rotating structure that allows the control circuit to track the sun such that the generation of electricity from the electromagnetic radiation is optimized;
wherein the electrical roadside assistance vehicle comprises a control circuit, a mounting structure, and a roadside assistance vehicle.

5. The electrical roadside assistance vehicle according to claim 4
wherein the power circuit is an electric circuit;
wherein the power circuit is an electrochemical device;
wherein the power circuit provides electric energy used to assist the vehicle that is in need of assistance;
wherein the power circuit provides the electrical energy necessary to operate the positioning circuit;
wherein the power circuit is an electric circuit;
wherein the power circuit powers the operation of the control circuit;
wherein the power circuit is an electrochemical device;
wherein the power circuit converts chemical potential energy into the electrical energy required to power the control circuit.

6. The electrical roadside assistance vehicle according to claim 5
wherein the power circuit is an independently powered electric circuit;
wherein by independently powered is meant that the power circuit can operate without an electrical connection to an external power source such as a generator.

7. The electrical roadside assistance vehicle according to claim 6
wherein the charging circuit is an electric circuit;
wherein the charging circuit receives electromagnetic radiation from the sun;
wherein the charging circuit converts the received electromagnetic radiation into electric energy;
wherein the charging circuit transmits the generated electric energy to the battery of the power circuit.

8. The electrical roadside assistance vehicle according to claim 7
wherein the positioning circuit is an electric circuit;
wherein the positioning circuit is an electromechanical device;
wherein the positioning circuit detects the position of the sun relative to the photovoltaic cell of the charging circuit;
wherein the positioning circuit provides the motive forces necessary to rotate the position of the photovoltaic cell relative to the sun;
wherein the positioning circuit forms a feedback mechanism that maintains the position of the photovoltaic cell at a roughly constant position relative to the position of the sun;
wherein the position of the photovoltaic cell relative to the sun that is maintained by the positioning circuit is selected to maximize the electric energy generated by the photovoltaic cell.

9. The electrical roadside assistance vehicle according to claim 8
wherein the charging circuit comprises a photovoltaic cell and a first diode;
wherein the photovoltaic cell and the first diode are electrically interconnected;
wherein the photovoltaic cell further comprises a second positive terminal and a second negative terminal.

10. The electrical roadside assistance vehicle according to claim 9
wherein the positioning circuit comprises a tracking circuit, an altitude motor, an azimuth motor, and a phototransistor;
wherein the tracking circuit, the altitude motor, the azimuth motor, and the phototransistor are electrically interconnected;
wherein the phototransistor further comprises a collector and an emitter.

11. The electrical roadside assistance vehicle according to claim 10
wherein the battery is an electrochemical device;
wherein the battery converts chemical potential energy into the electrical energy used to power the control circuit;
wherein the battery is a rechargeable battery;
wherein the power switch is a maintained switch;

wherein the power switch forms a series connection between the battery and the power distribution port;

wherein the power switch controls the flow of electric energy from the battery to the power distribution port;

wherein the power distribution port is an electric port;

wherein the power distribution port presents electric energy transmitted from the battery that can be used to assist the vehicle that is in need of assistance;

wherein the power distribution port forms an electrical connection with the cable;

wherein the power distribution port receives the electric energy transmitted from the battery through the power distribution port.

12. The electrical roadside assistance vehicle according to claim 11 wherein the power distribution plug inserts into the power distribution port such that the power distribution plug transmits electricity from the power distribution port into the cable;

wherein the second diode is an electric circuit element;

wherein the second diode limits the flow of electric energy through the second diode to a single direction;

wherein the second diode electrically connects in series between the power switch and the power distribution port such that electric energy will not flow from the cable into the battery through the power switch.

13. The electrical roadside assistance vehicle according to claim 12 wherein the photovoltaic cell is an electric device that converts electromagnetic radiation into electrical energy;

wherein the photovoltaic cell is directly wired to the battery;

wherein the photovoltaic cell is an electrical circuit that reverses the polarity of the rechargeable battery;

wherein the first diode is an electrical device that allows current to flow in only one direction;

wherein the first diode installs between the rechargeable battery and the photovoltaic cell such that electricity will not flow from the first positive terminal of the rechargeable battery into the second positive terminal of photovoltaic cell.

14. The electrical roadside assistance vehicle according to claim 13 wherein the tracking circuit is an electric circuit;

wherein the tracking circuit controls the operation of the altitude motor;

wherein the tracking circuit controls the operation of the azimuth motor;

wherein the tracking circuit detects the position of the sun relative to the photovoltaic cell of the charging circuit;

wherein the tracking circuit forms a feedback mechanism that maintains the position of the photovoltaic cell at a roughly constant position relative to the position of the sun;

wherein the tracking circuit uses the altitude motor to adjust the altitude angle of the photovoltaic cell relative to the sun;

wherein the tracking circuit uses the azimuth motor to adjust the azimuth angle of the photovoltaic cell relative to the sun.

15. The electrical roadside assistance vehicle according to claim 14 wherein the altitude motor is an electric motor;

wherein the tracking circuit controls the direction of rotation of the altitude motor;

wherein the altitude motor controls the speed of rotation of the altitude motor;

wherein the altitude motor physically attaches to the photovoltaic cell such that the rotation of the altitude motor adjusts the altitude angle of the photovoltaic cell.

16. The electrical roadside assistance vehicle according to claim 15 wherein the azimuth motor is an electric motor;

wherein the tracking circuit controls the direction of rotation of the azimuth motor;

wherein the azimuth motor controls the speed of rotation of the azimuth motor;

wherein the azimuth motor physically attaches to the photovoltaic cell such that the rotation of the azimuth motor adjusts the azimuth angle of the photovoltaic cell.

17. The electrical roadside assistance vehicle according to claim 16 wherein the phototransistor is a photoelectric circuit element;

wherein the phototransistor forms a series electric connection between the battery and the tracking circuit;

wherein the phototransistor controls the flow of electric energy into the tracking circuit such that the tracking circuit will only operate when the phototransistor detects the presence of the sun;

wherein the phototransistor operates as switch;

wherein when light is applied to the phototransistor, the phototransistor will act like a closed switch allowing current flow from the collector to the emitter;

wherein when the light is removed from the base, the phototransistor will act like an open switch prohibiting current flow from the collector to the emitter.

18. The electrical roadside assistance vehicle according to claim 17 wherein the mounting structure is a mechanical structure;

wherein the mounting structure forms a pedestal that elevates the charging circuit and the positioning circuit above the bed of the roadside assistance vehicle;

wherein the mounting structure raises the photovoltaic cell, the altitude motor, and the azimuth motor above the bed of the roadside assistance vehicle such that the photovoltaic cell can rotate relative to the roadside assistance vehicle;

wherein the photovoltaic cell rotates relative to the roadside assistance vehicle such that the photovoltaic cell maintains a roughly fixed position relative to the sun.

* * * * *